United States Patent [19]

Lawrie

[11] Patent Number: 4,880,969
[45] Date of Patent: Nov. 14, 1989

[54] OPTICAL TOUCH PANEL WITH HEAT SINK

[75] Inventor: George S. Lawrie, Mississauga, Canada

[73] Assignee: Litton Systems, Inc., Beverly Hills, Calif.

[21] Appl. No.: 198,284

[22] Filed: Aug. 26, 1988

Related U.S. Application Data

[63] Continuation of Ser. No. 858,364, Apr. 30, 1986, abandoned.

[51] Int. Cl.$^4$ .......................... G09G 1/00; G01V 9/04
[52] U.S. Cl. .................................. 250/221; 340/712; 341/31
[58] Field of Search ......................... 250/221, 229, 561; 340/555, 556, 557, 644, 825.81, 825.82, 825.83, 712; 341/31

[56] References Cited

U.S. PATENT DOCUMENTS

| | | | |
|---|---|---|---|
| 3,392,763 | 1/1976 | Weinstein | 250/221 |
| 3,398,290 | 8/1968 | Basehore et al. | 250/221 |
| 3,526,775 | 9/1970 | Friedrich et al. | 250/221 |
| 3,623,047 | 11/1971 | Stallebrass | 340/644 |
| 3,673,327 | 6/1972 | Johnston et al. | 250/221 |
| 3,816,745 | 6/1974 | Primm et al. | 250/221 |
| 3,851,328 | 11/1974 | Sottile et al. | 340/337 |
| 3,862,415 | 1/1975 | Harnden et al. | 250/221 |
| 3,906,222 | 9/1975 | Astier et al. | 250/221 |
| 3,937,952 | 2/1976 | Ripley et al. | 341/31 |
| 3,956,745 | 5/1976 | Ellis | 340/825.83 |
| 4,021,119 | 5/1977 | Stauffer | 250/561 |
| 4,243,879 | 1/1981 | Carroll et al. | 250/221 |
| 4,254,333 | 3/1981 | Bergstrom | 250/221 |
| 4,267,443 | 5/1981 | Carroll et al. | 250/221 |
| 4,306,147 | 12/1981 | Fukuyama et al. | 250/221 |
| 4,384,201 | 5/1983 | Carroll et al. | 250/221 |
| 4,436,972 | 3/1984 | Scanlon | 340/644 |
| 4,467,193 | 8/1984 | Carroll | 250/216 |
| 4,607,160 | 8/1986 | Sakakino | 250/229 |

Primary Examiner—Edward P. Westin
Attorney, Agent, or Firm—Lynn & Lynn

[57] ABSTRACT

A programmable touch panel comprises an interactive control/display panel having the capability of entering and updating information to a host computer via a plurality of multifunction programmable keys. An optical switch is associated with each key for operator selection. Each key includes a light source mounted to a circuit board for sending a light beam through a hole in a heat sink toward a reflector that directs the beam across a touch panel. A second reflector then directs the beam through a second hole in the heat sink toward a detector mounted on the circuit board.

14 Claims, 7 Drawing Sheets

OPTICAL TOUCH PANEL WITH HEAT SINK

This is a continuation of co-pending application Ser. No. 858,364 filed on Apr. 30, 1986, now abandoned.

BACKGROUND OF THE INVENTION

This invention relates generally to keyswitch activated displays and particularly to displays including keyswitches in which interruption of a beam of radiant energy generates an electrical signal. Still more particularly, this invention relates to a keyswitch activated display including an optical keyswitch responsive to the touch of an operator's finger or a stylus to display alphanumeric or graphic characters.

Keyswitch activated displays are used with electronic systems for displaying legends selected by an operator. The display implements interaction between the operator and the system so that the operator may ascertain that a selected operational feature of the system was activated in response to a touch on the keyswitch.

A touch input device typically has a relatively flat screen or plate with a space in front of the screen being traversed by one or more beams of radiant energy. The radiant energy generally defines a line or a plane parallel to the surface of the screen. Interruption of the radiant energy flow is detected to form an electrical signal indicative of the location of the point where the screen has been touched. Typically, an infrared light source such as a light emitting diode (LED) produces the radiant energy in the form of a beam of infrared light. Phototransistors or other infrared detectors detect the infrared light beam.

The LEDs and phototransistors are often used in a touch panel with the LEDs being mounted along one side and the phototransistors being mounted along the opposite edge. The usual arrangement thus has the light sources and light detectors coplanar with or nearly coplanar with the plane of the keypad. The typical structure requires electrical circuitry in the plane of the touch panel, which adds to the complexity and area of such devices.

U.S. Pat. No. 4,467,193 to Carroll discloses a parabolic light emitter and detector unit including a solid state light emitter embedded in a transparent body formed with one planar surface and an opposing surface formed as a paraboloid. The outer surface of the paraboloid is coated with a light reflecting material to form a mirror. The light emitter is located at the focus of the paraboloid so that light reflecting therefrom forms a parallel beam.

U.S. Pat. No. 4,384,201 and U.S. Pat. No. 4,267,443 to Carroll et al. disclose a three dimensional protective interlock apparatus that includes a photoelectric touch panel. The photoelectric touch panel has a first pair of crossed light beams that define a first plane. When the beams are broken by an object, the panel provides signals indicative of the coordinates of the object in the plane. A second pair of crossed light beams define a second plane, and the relationship between the beams in the two planes is employed to distinguish between objects that interrupt the beams based upon the size, spatial orientation and velocity. The number of beams broken in the planes are counted to determine the size of the interrupting object.

U.S. Pat. No. 4,306,147 to Fukuyama et al discloses a photoelectric switching apparatus having a light projecting device and a light detecting device mounted such that the output beam of the light projecting device crosses the region from which a light beam can impinge upon the detector and produce a response. Light from the projecting device normally is not incident upon the detector except when an object interrupts the beam at a location where light reflected from the object impinges upon the detector.

U.S. Pat. No. to Bergstrom discloses an optoelectronic circuit element for effecting an manually controlled output signal. The optoelectronic circuit element includes an LED that directs a light beam into a glass prism such that the beam totally internally reflects at an interface toward a detector. The amount of light reflected to the detector is decreased when the finger of an operator contacts the prism at the point of reflection. The finger is an absorbing medium that interacts with the evanescent portion of the beam to couple energy therefrom. Decreasing the intensity of the light incident upon the detector produces an electrical signal.

U.S. Pat. No. 4,243,879 to Carroll et al. discloses a touch panel that includes apparatus for sampling the ambient light immediately before a pulse of radiant energy is transmitted to a photoelectric transducer. The output of the photoelectric transducer is compared with the output during the previous ambient interval to develop a signal indicative of the presence or absence of the pulse irrespective of ambient light fluctuations.

U.S. Pat. No. 3,862,415 to Harnden, Jr. et al. discloses an optoelectronic object detector using a semiconductor light source. The light source and a photosensitive device are positioned on a single header member with an optical barrier therebetween. Light emitted by the light source is reflected from an object in the path of the light, and impinges upon the detector. The barrier prevents the light source from directly illuminating the detector.

U.S. Pat. No. 3,906,222 to Astler et al. is directed to an electrical push button switch with photoelectrical switching elements. The push button is slidably supported in a casing, and a return spring acts on the push button to urge it to a raised position away from the casing. The casing includes two hollow portions facing one another and formed of transparent material, a light source in one hollow portion and a photoelectric element in the other hollow portion. the push button carries a screen for blocking communication between the light source and the photoelectric element when the push button is depressed to an operative position.

U.S. Pat. No. 3,851,328 to Sottile et al. discloses an optical solid state switch for use in a control panel. A light emitting diode is embedded in one side of the panel, and a photodetector is is embedded in the other side so that an operator may place his finger in the opening to obtain a switching action. Logic circuits and display devices may be added to the switch to permit it to be used as an alternate action switch, potentiometer, rotary switch and thumbwheel apparatus. A multiplexing apparatus is included in applications where a large number of these devices are installed on a control panel.

SUMMARY OF THE INVENTION

The present invention provides a programmable touch panel (PTP) that overcomes the disadvantages of previous optical keyswitches. The present invention comprises an interactive control/display panel with the capability of entering and updating information to a host computer via a plurality of multifunction programmable keys, or programmable display modules (PDMs). An optical switch is associated with each PDM for operator selection.

The interactive optical keyswitch according to the present invention comprises a light source for providing a light beam along a first optical path A reflector reflects the light beam perpendicular to the first optical path so that the light beam traverses a second optical path. A second reflector reflects the light beam perpendicular to the second optical path so that the light beam traverses a third optical path perpendicular to the second optical path and opposite in direction to the first optical path. A detector produces a detector signal in response to light traversing the third optical path.

The first and second reflectors comprise optical wedges having reflective surfaces thereon. The keyswitch of the invention may further include an attenuator for reducing the intensity of light propagating toward the detector before such light impinges upon the detector to prevent inadvertent actuation of the keyswitch.

The keyswitch of the invention may further include a printed circuit board; a heat sink adjacent the printed circuit board, the heat sink including a plurality of openings therethrough; a programmable display module electrically connected to the printed circuit board, the heat sink being between the printed circuit board and the programmable display module to sink heat therefrom, the electrical connection between the programmable display module and the printed circuit board being made through a first one of the plurality of openings in the heat sink; and a neutral density filter generally parallel to the second optical path, the first and second optical wedges being positioned on opposite sides of the touch panel such that the touch panel is between the second optical path and the programmable display module.

The keyswitch of the present invention preferably has the light source mounted to the printed circuit board such that the first optical path passes through an opening in the heat sink. The detector is preferably mounted to the printed circuit board such that the third optical path passes through a third one of the plurality of openings in the heat sink.

The keyswitch of the invention may further include a flexible membrane having reflective surfaces formed thereon instead of using optical wedges to reflect the light beam along the desired paths.

The keyswitch may also comprise means for reflecting the beam twice across the touch panel to provide increased resolution.

The method of the invention for forming a keyswitch comprises the steps of producing a light beam directed along a first optical path; reflecting the light beam along a second optical path perpendicular to the first optical path; reflecting the light beam along a third optical path perpendicular to the second optical path and opposite in direction to the first optical path; and detecting light traversing the third optical path. The method may further include the step of reducing the intensity of light propagating along the third optical path before detecting such light.

The method of the invention for forming a keyswitch may comprise the steps of reflecting the beam twice across a touch panel to provide increased resolution.

DESCRIPTION OF THE PREFERRED EMBODIMENT

Figure 1:
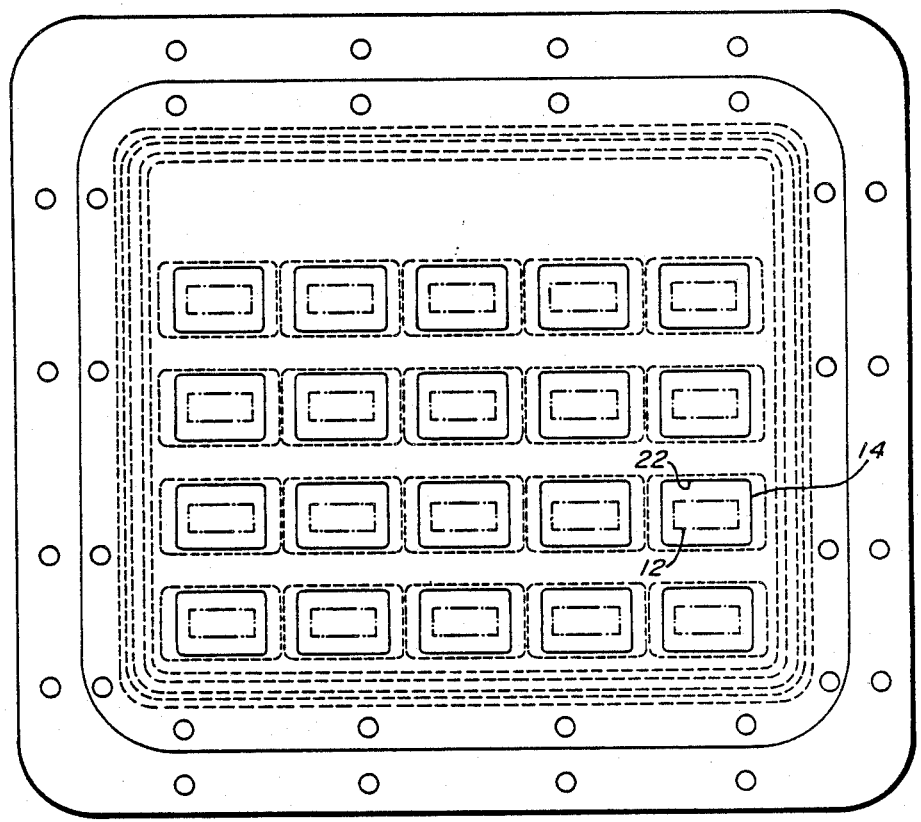
FIG. 1 is a plan view of a programmable touch panel according to the invention.
Figure 2:
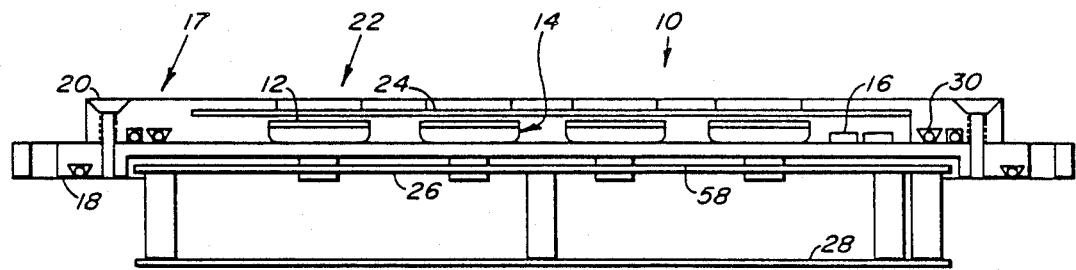
FIG. 2 is an elevation view of the programmable touch panel of FIG. 1.

Referring to FIGS. 1 and 2, a programmable touch panel 10 includes a plurality of interactive optical keyswitches 12 for inputting information for display on a display unit 14. In a preferred embodiment, programmable touch panel 10 includes twenty interactive optical keyswitches 12 arranged in a 4×5 array.

Referring to FIG. 2, programmable touch panel 10 includes a bezel 17 connected to a plate 18 by any suitable means, such as a plurality of screws 20. Interactive optical keyswitches 12 are recessed in corresponding windows 22 in bezel 17. A neutral density filter 24 preferably is mounted in the bezel behind interactive optical keyswitches 12. Interactive optical keyswitches 12 are mounted to an interconnect board 26, which may be mounted to plate 18.

Figure 3:
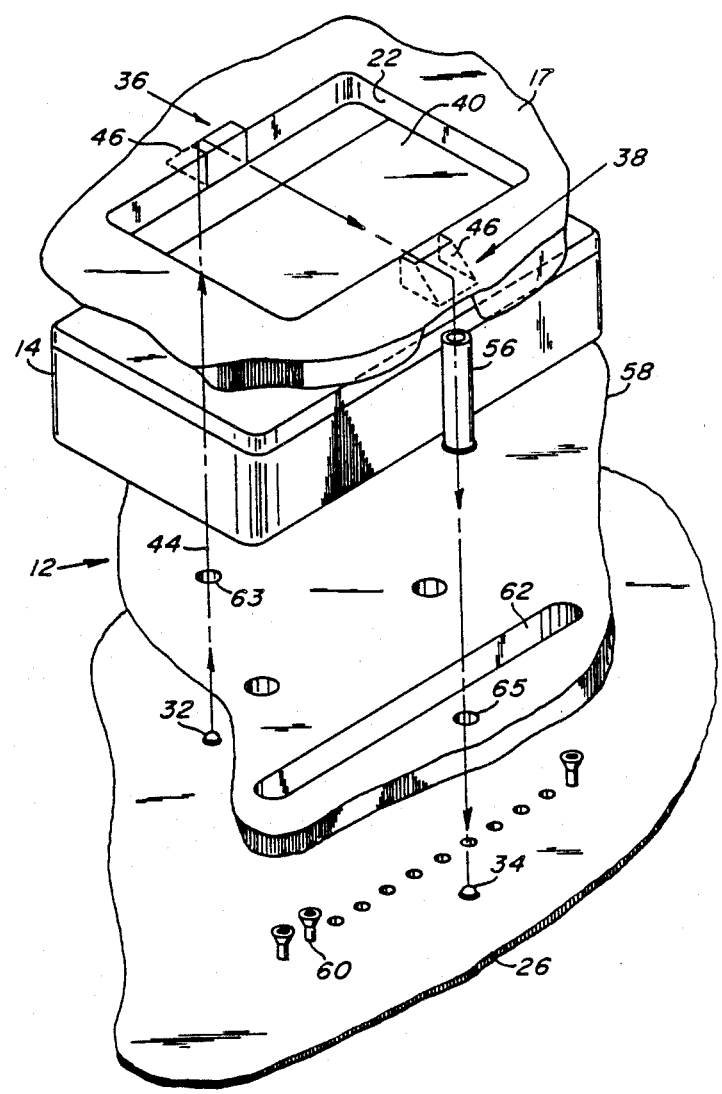
FIG. 3 is an exploded perspective view of a programmable display module included in the programmable touch panel of FIG. 1 showing a light beam crossing a key pad touch panel between a pair of optical wedges.
Figure 4:
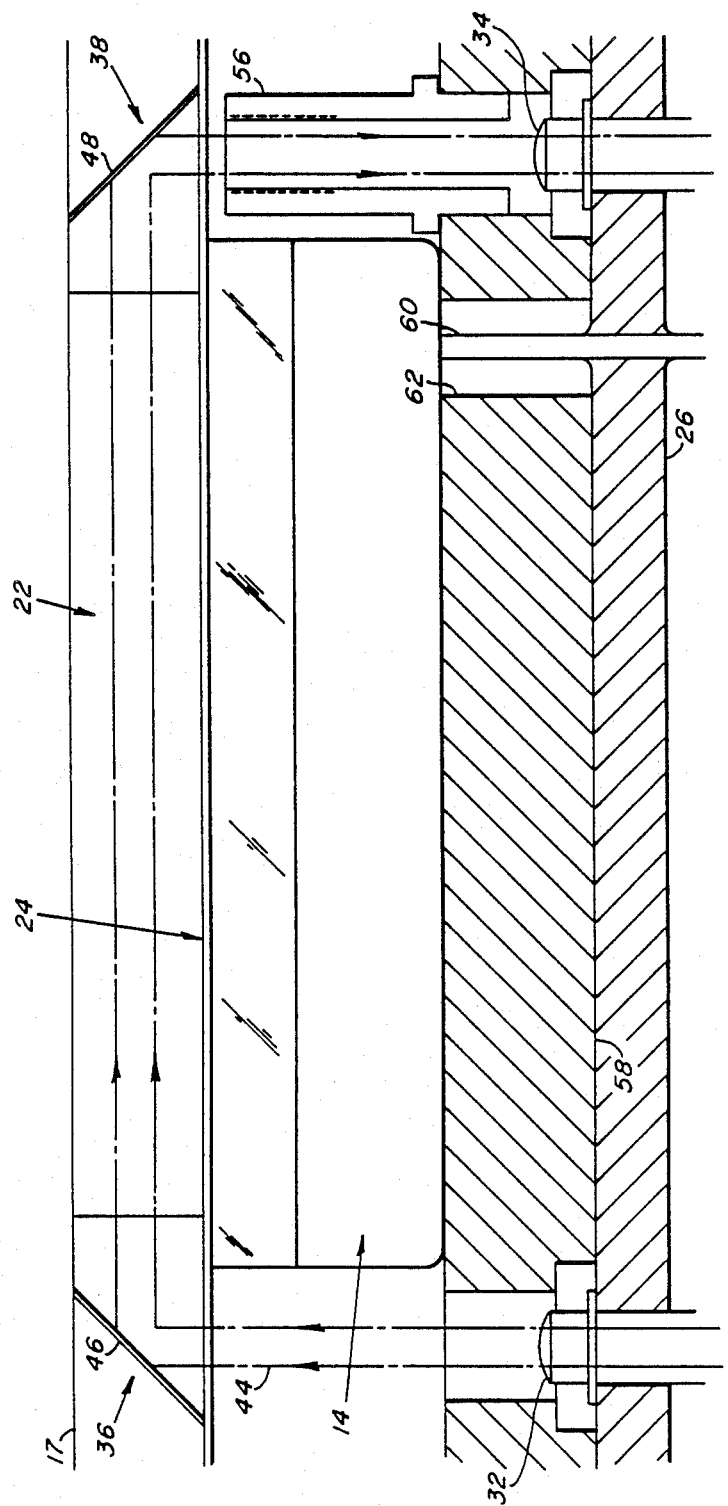
FIG. 4 is a cross sectional view of the programmable display module of FIG. 3.

Referring to FIGS. 3 and 4, each interactive optical keyswitch 12 comprises a light source 32, a light detector 34 and a pair of optical wedges 36 and 38. Interactive optical keyswitch 12 may further include a neutral density filter 24 mounted in display window 22 therein.

Optical wedges 36 and 38 are mounted on opposite sides of window area 22. Light source 32 is mounted below optical wedge 36 such that a light beam 44 emitted from light source 32 is transmitted through opening 63 of heat sink 58 and is incident upon a reflective surface 46 of optical wedge 36.

Light source 32 preferably emits light in the infrared (IR) region of the electromagnetic spectrum, and light detector 34 is accordingly preferably a photodetector that produces an electrical signal in response to incident IR light. Optical wedge 36 is preferably formed of a material such as BK-7 Glass that is a good transmitter of IR light. Reflective surface 46 is preferably formed of a material such as aluminum that has high reflectivity for IR light. Reflective surface 46 may be formed by vapor deposition or sputtering aluminum onto a smooth planar surface 50 of optical wedge 36.

Light beam 44 impinges upon reflective surface 46 and reflects parallel to the outer surface of neutral density filter 24. Reflective surface 46 preferably is at an angle of 45 degrees to the incident beam 44 so that the output of light source 32 is perpendicular to touch panel 40 while the reflection from reflective surface 46 is parallel thereto.

Optical wedge 38 is formed similarly to optical wedge 36 and, therefore, has a reflective surface 48 that is oriented at an angle of 45 degrees to the beam reflected from reflective surface 46. The beam reflected from reflective surface 48 is therefore directed in a direction opposite to the output of light source 32. The beam reflected from reflective surface 48 preferably passes through an attenuator 56 and opening 65 of heat sink 58 and then impinges upon detector 34. Detector 34 produces an electrical output signal in response to IR radiation having intensity greater than a predetermined threshold. Attenuator 56 prevents detector 34 from saturating and from producing an output signal in response to light that emanates from sources (not shown) other than light source 32. It is very unlikely that light from other sources will have intensity sufficient to activate detector 32 after traversing attenuator 56.

Neutral density filter 24 is preferably mounted in the lower portion of window 22. Neutral density filter 24 is cemented to a bezel 17 and is partially transparent. Neutral density filter 24 provides means for sealing the area below window 22 from foreign matter and is suitably coated to prevent IR radiation from passing therethrough.

Each interactive optical keyswitch 12 is preferably mounted behind the window and neutral density filter 24 to a heatsink 58. As shown in FIG. 3, electrical connections 60 project through a slot 62 in heatsink 58 from printed circuit board 26 to each interactive optical keyswitch 12. All of the electrical connections to light source 32, detector 34 and programmable display module 14 may be accomplished with connections 60 so that no wiring or other electrical connections are required in interactive optical keyswitches 12.

Figure 9:
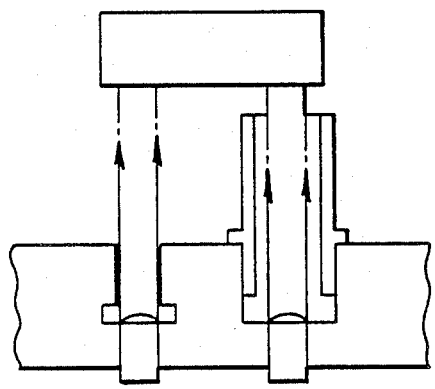
FIG. 9 is an elevation view of the touch panel of FIG. 8 showing light from two sources impinging upon a reflector.

Referring to FIG. 9, programmable display module 14 contains an electronic control system 66 that displays alphanumeric or graphic symbols on display 14 in response to interruption of beam 44. Suitable display systems, including for example liquid crystals and LEDs, are well known in the art and therefore are not described in detail herein. If interactive optical keyswitch 12 has been turned on and there have been no interruptions of beam 44 between the reflective surfaces 28 and 30, then the display module 14 is blank. Interruption of the beam, for example by an operator's finger or by a stylus such as a pencil, causes the output of the photodetector 34 to become zero. Control circuit 66 produces an output in response to the null output of photodetector 34 to activate the display module 14 to display a predetermined legend (not shown). The legend is displayed until beam 44 is interrupted a second time, which causes the display module 14 to become blank again.

Programmable display module 14 preferably includes an LED array that has a 16×35 matrix of LEDs in a 0.02 inch pitch. Each LED is preferably about 0.01 in.×0.01 in. The array preferably produces a font having standard characters that are about 0.10 in. high and 0.14 in. wide. The standard color of the LEDs is green light having a wavelength of about 565 nm. Yellow LEDs producing light having a 580 nm wavelength and red LEDs producing light having a 635 nm wavelength are optional.

Figure 5:
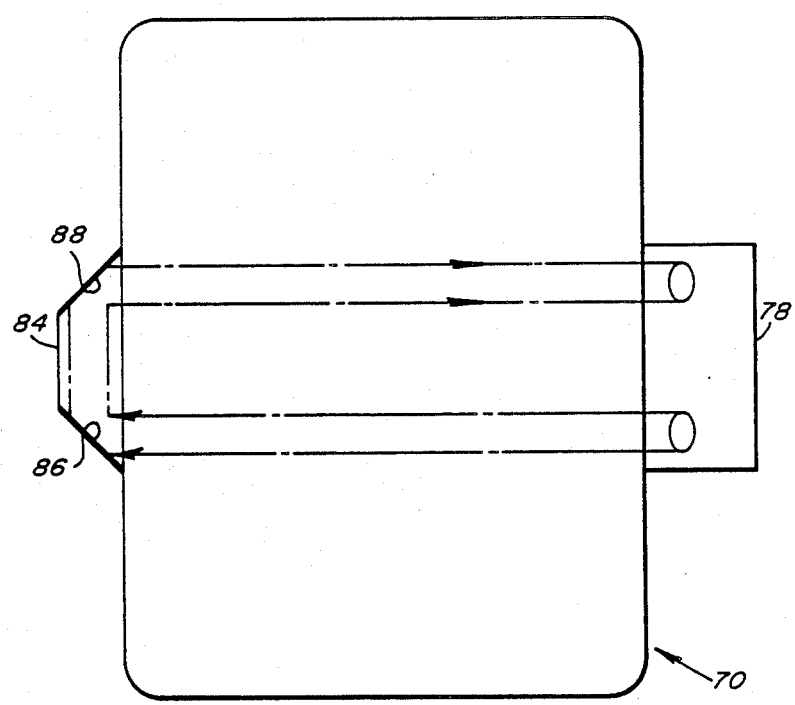
FIG. 5 is a plan view showing a light beam from a single source crossing a touch panel twice between a second pair of optical wedges.
Figure 6:
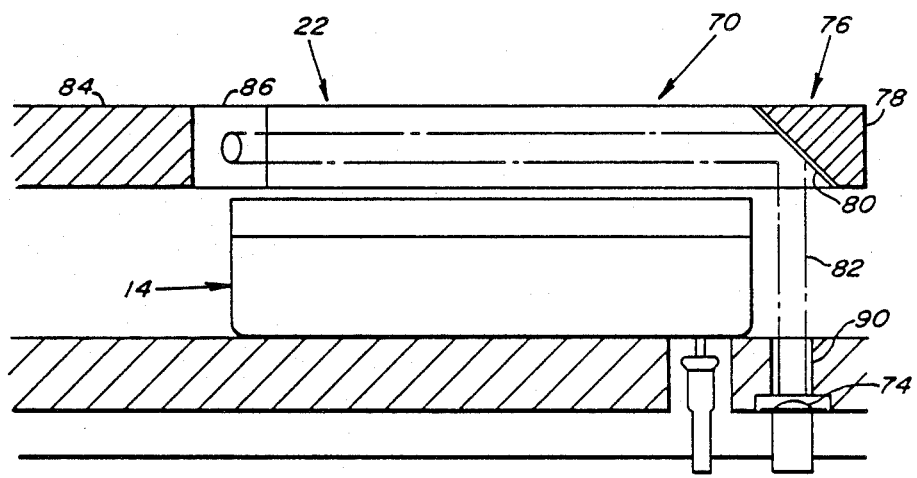
FIG. 6 is a cross sectional view of the programmable display module of FIG. 5.
Figure 7:
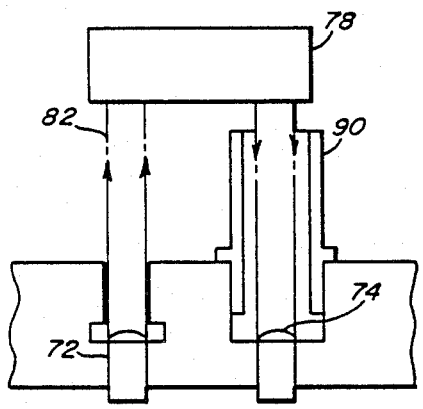
FIG. 7 is a partial cross sectional view of the programmable display module of FIG. 5 showing a light source and a light detector.

Referring to FIGS. 5–7, an interactive optical keyswitch 70 according to the invention may have a light source 72 and a corresponding detector 74 located on a side 76 of the window 22. As best shown in FIG. 7, light source 72 and detector 74 are spaced apart below and to the right of window 22. An optical wedge 78 has a reflecting surface 80 that reflects a beam 82 emanating from light source 72 across touch panel 20 to an optical wedge 84. A second reflective surface 86 in optical wedge 84 is oriented to reflect beam 82 parallel to touch panel 20. The beam than strikes a second reflective surface 88 in optical wedge 84. The reflective surfaces 80, 86 and 88 may be formed in the manner described above with reference to reflective surface 46. Reflective surface 88 directs beam 82 back to optical wedge 78 where reflective surface 80 reflects the beam toward an attenuator 90 and detector 74. Interactive optical keyswitch 70 thus causes the beam to traverse window 22 twice, which provides twice the resolution of interactive optical keyswitch 12 wherein the beam traverses the window 22 one time.

Figure 8:
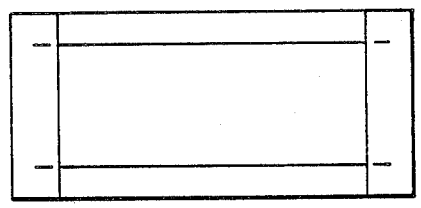
FIG. 8 is a plan view of a showing a light beam from a pair of sources crossing a touch panel between a pair of optical wedges.

Referring to FIGS. 8 and 9, a keyswitch 91 may include two light sources 93 and 95 that produce light beams 97 and 99, respectively. The light beams 97 and 99 impinge upon a reflective member 101 and reflect across a touch panel 103 to a reflective member 105. The reflective member 105 directs the beams 97 and 99 to light detectors (not shown) that may be similar to the light detector 34 described above with reference to FIG. 4.

Figure 10:
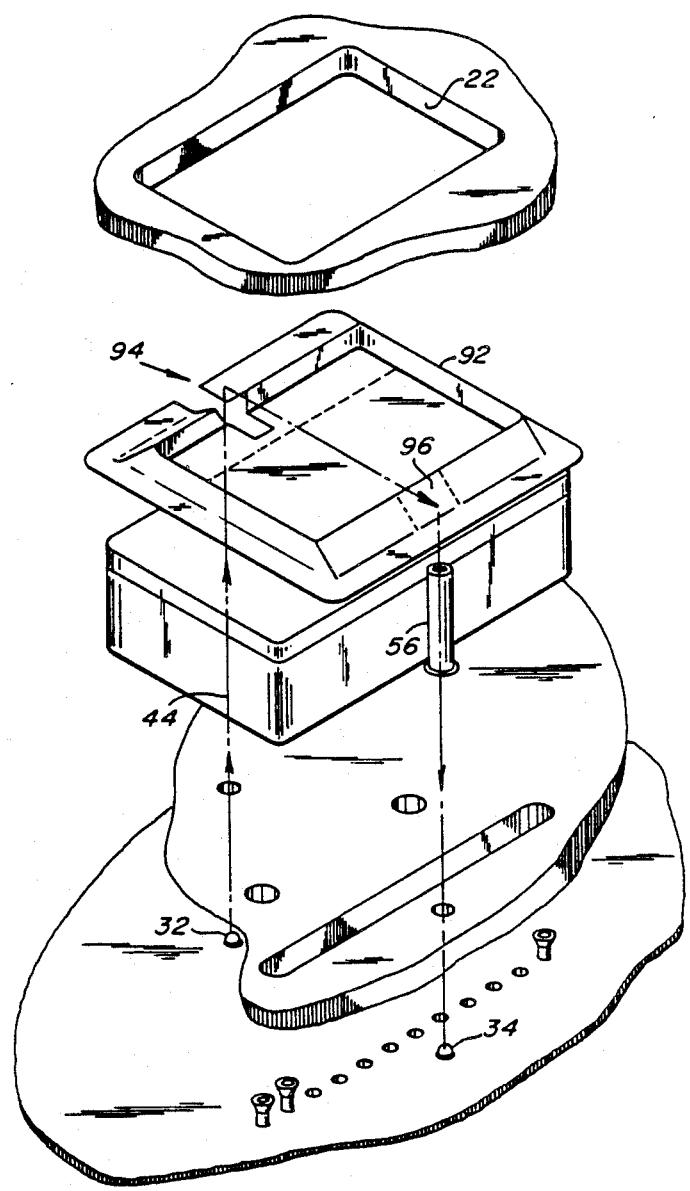
FIG. 10 is an exploded perspective view of a programmable display module according to the invention in which the light beam is confined to a membrane having a pair of reflective surfaces thereon.

Referring to FIG. 10, optical wedges 36 and 38 and touch panel 40 of FIGS. 3 and 4 may be replaced by a shaped membrane 92 that is mounted in window 22. Membrane 92 is formed to have a pair of integral reflecting planes 94 and 96 positioned on opposite sides of window 22 to simulate the 45 degree reflective surfaces of optical wedges 36 and 38. Membrane 92 has neutral density filter properties, thereby eliminating the need for a separate filter and sealing element. Light from light source 32 strikes reflecting plane 94 and is reflected through membrane 92 across window 22 to reflecting plane 96. Reflecting plane 96 reflects the light downward through attenuator 90 to detector 34.

Display module 14 is actuated by the touch of an operator's finger within the well of the membrane 92, to interrupt the light beam and produce a null signal output from detector 34.

Figure 11:
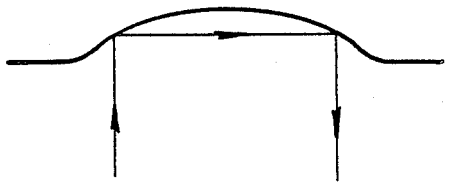
FIG. 11 is an elevation view showing a second embodiment of the membrane of FIG. 10.

A second embodiment of a keyswitch including a flexible membrane is shown in FIG. 11. Instead of forming a well as in the embodiment of FIG. 10, a membrane 110 forms a dome 112. Light from the light source travels through the dome without interruption unless the dome is depressed to obstruct the light path. The dome shaped membrane is sufficiently flexible that a person may easily depress it with a finger to actuate the keyswitch.

Figure 12:
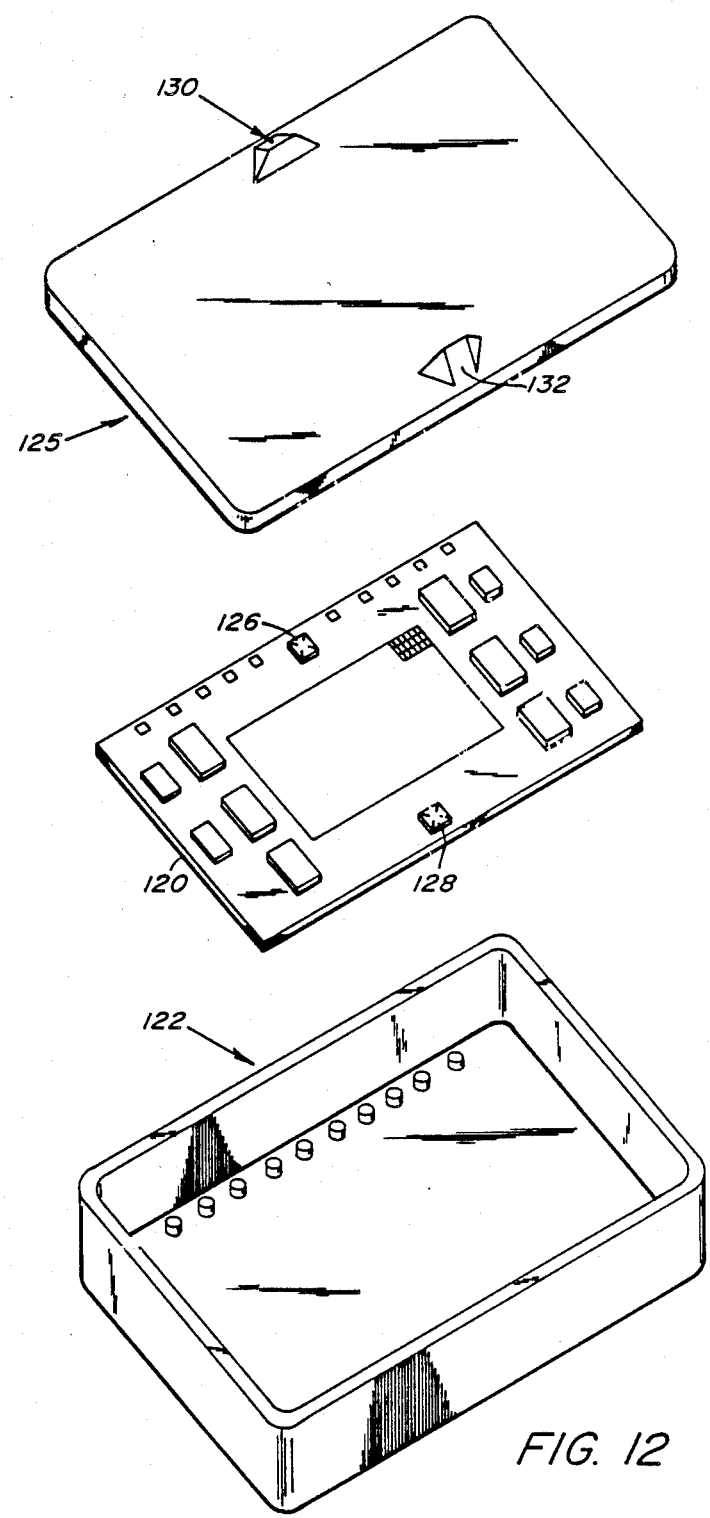
FIG. 12 is an exploded perspective view showing a method of integrating a keyswitch into a programmable display module.

Referring to FIG. 12, the interactive optical keyswitch may be packaged within the display module to form an integral structure. The module is constructed with a ceramic substrate 120 attached to the floor of a shallow metal container 122 that is enclosed with a transparent window 125. The substrate 120 is used as a mounting surface for the LED array and the LED driver electronics 124. Suitable light source and detector chips 126 and 128, respectively are attached to the surface of the substrate. The transparent window 125 may be formed with 45° surfaces 130 and 132 to direct the light beam across the display surface.

What is claimed is:

1. A programmable touch panel, comprising:
   a plurality of keyswitches for entry of data, each keyswitch comprising;
     a light source for providing a light beam along a first optical path;
     first means for reflecting the light beam so that the light beam traverses a second optical path;
     second means for reflecting the light beam so that the light beam traverses a third optical path generally parallel to the first optical path and opposite in direction thereto; and
     detector means for producing a detector signal in response to light traversing the third optical path;
   a display module for displaying information input via the keyswitches;
   a printed circuit board upon which the plurality of keyswitches and the display module are mounted; and
   a heat sink adjacent the printed circuit board, the heat sink including a plurality of openings therethrough such that the first and third optical paths for each keyswitch pass through corresponding openings in the heat sink.

2. The touch panel of claim 1 wherein the first reflecting means comprises a first optical wedge having a first reflective surface thereon and the second reflective means comprises a second optical wedge having a second reflective surface thereon, each keyswitch being positioned such that the second optical path therein is exposed to allow interruption thereof for controlling the propagation of light to the detector means.

3. The touch panel of claim 2 wherein each keyswitch further includes attenuator means for reducing the intensity of the light propagating along the third optical path before such light impinges upon its detector means.

4. The touch panel of claim 3 wherein the display module further comprises:
   a plurality of light emitting diodes;
   an electrical connection between the printed circuit board and the plurality of keyswitches; and
   means for actuating a display in response to interruptions of keyswitch light beams.

5. The touch panel of claim 1 further comprising means for connecting the heat sink between the printed circuit board and the display module to sink heat therefrom, the electrical connection between the display module and the printed circuit board being made through a first group of the plurality of openings in the heat sink.

6. The touch panel of claim 1, further comprising:
   means for mounting the keyswitch light sources to the printed circuit board such that the first optical path of each keyswitch passes through a second group of the plurality of openings in the heat sink and each keyswitch detector means is mounted to the printed circuit board in such a manner that the third optical path of each keyswitch passes through a third group of the plurality of openings in the heat sink; and
   a flexible membrane positioned in the second optical path, the first and second reflecting means being formed in the membrane.

7. The touch panel of claim 1, further comprising a plurality of neutral density filters placed generally parallel to the second optical path of each of the plurality of keyswitches, the first and second optical wedges within each keyswitch being positioned on opposite sides of each neutral density filter.

8. A method for forming a programmable touch panel, comprising the steps of:
   providing a plurality of keyswitches for entry of data by a method that includes the steps of;
     providing a light beam along a first optical path in each keyswitch;
     reflecting the light beam perpendicular to the first optical path so that the light beam traverses a second optical path;
     reflecting the light beam perpendicular to the second optical path so that the light beam traverses a third optical path at an angle to the second optical path and opposite in direction to the first optical path; and
     producing a detector signal in response to light traversing the third optical path;
   providing a display module for displaying information input via the keyswitches;
   mounting the plurality of keyswitches on the display module; and
   mounting a heat sink adjacent the printed circuit board, the heat sink including a plurality of openings therethrough such that the first and third optical paths for each keyswitch pass through corresponding openings in the heat sink.

9. The method of claim 8 including the step of forming a first optical wedge having a first reflective surface thereon a second optical wedge having a second reflective surface thereon.

10. The method of claim 9, including the step of positioning each keyswitch such that the second optical path therein is exposed to allow interruption interruption thereof for controlling the propagation of light to the detector means.

11. The method of claim 10 including the step of reducing the intensity of the light propagating along the third optical path before such light impinges upon its corresponding detector means.

12. The touch panel of claim 8 further comprising the steps of:
   mounting a plurality of light emitting diodes to the printed circuit board;
   electrically connecting the printed circuit board to the plurality of keyswitches; and
   actuating a display in response to interruptions of keyswitch light beams.

13. The method of of claim 8 further comprising the steps of connecting the heat sink between the printed circuit board and the display module to sink heat therefrom; and
   connecting the electrical circuitry in the display module and the printed circuit board through a first group of the plurality of openings in the heat sink.

14. The method of claim 8, further comprising the steps of:
   mounting the keyswitch light sources to the printed circuit board such that the first optical path of each keyswitch passes through a second group of the plurality of openings in the heat sink and each keyswitch detector means is mounted to the printed circuit board in such a manner that the third optical paths passes through a third group of the plurality of openings in the heat sink;

positioning a flexible membrane in the second optical path; and forming the first and second reflecting means in the menbrane so that the first reflecting means reflects light from the source toward the second reflecting means and the second reflecting means reflects light propagating along the second optical path toward the detecting means.

* * * * *